(12) United States Patent
Bermudez Rodriguez et al.

(10) Patent No.: US 10,582,675 B2
(45) Date of Patent: *Mar. 10, 2020

(54) CONTROLLING VALVE OPERATION USING PRESSURE

(71) Applicant: International Business Machines Corporation, Armonk, NY (US)

(72) Inventors: Sergio Adolfo Bermudez Rodriguez, Boston, MA (US); Hendrik F. Hamann, Yorktown Heights, NY (US); Levente Klein, Tuckahoe, NY (US); Theodore Gerard van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/801,004

(22) Filed: Nov. 1, 2017

(65) Prior Publication Data

US 2018/0064040 A1 Mar. 8, 2018

Related U.S. Application Data

(63) Continuation of application No. 14/976,730, filed on Dec. 21, 2015, now Pat. No. 9,924,645.

(51) Int. Cl.
*F16K 15/10* (2006.01)
*F16K 3/26* (2006.01)
(Continued)

(52) U.S. Cl.
CPC ......... *A01G 25/165* (2013.01); *A01G 25/162* (2013.01); *F16K 17/065* (2013.01);
(Continued)

(58) Field of Classification Search
CPC ....... F16K 15/10; F16K 17/105; F15B 13/028
(Continued)

(56) References Cited

U.S. PATENT DOCUMENTS

| 3,917,174 A | 11/1975 | Hildebrandt et al. |
| 5,271,428 A * | 12/1993 | Dunn ................. G05D 16/187 137/509 |

(Continued)

FOREIGN PATENT DOCUMENTS

| EP | 0537849 | 4/1993 |
| WO | 2010061375 | 6/2010 |

OTHER PUBLICATIONS

Bermad Irrigation, "Bermad Irrigation Hydraulic Control Valves", Irrigation Short Catalogue, 2014, pp. 1-208 (refer to pp. 30-31).
(Continued)

*Primary Examiner* — Marina A Tietjen
*Assistant Examiner* — Paul J Gray
(74) *Attorney, Agent, or Firm* — Fleit Intellectual Property Law; Gary Winer

(57) ABSTRACT

A valve body has a piston that slides within the body through four successive positions. The piston has a head, and an upper and lower skirt, with a port in the upper skirt. In the first position, a bias force urges the piston to the first of four positions, in which the piston port is closed. In a second position, the piston port aligns with a low pressure port in the valve body, when a low pressure supply of water is connected. In a third position, greater pressure again closes the piston port. In a fourth position, at a still greater pressure, the piston port aligns with a high pressure port in the valve body. The bias force or a location of the piston port can be varied for valves along a supply line, whereby varying supply pressure opens different valves, thereby enabling addressing of valves according to supply pressure.

20 Claims, 2 Drawing Sheets

(51) Int. Cl.
*A01G 25/16* (2006.01)
*F16K 17/06* (2006.01)
*F16K 17/08* (2006.01)
*F16K 31/363* (2006.01)
*F16K 31/122* (2006.01)

(52) U.S. Cl.
CPC ........ *F16K 17/082* (2013.01); *F16K 31/1223* (2013.01); *F16K 31/363* (2013.01)

(58) Field of Classification Search
USPC ............ 137/516.25, 516.27, 543.19, 625.12, 137/625.13, 625.14, 625.39; 138/30
See application file for complete search history.

(56) References Cited

U.S. PATENT DOCUMENTS

| | | |
|---|---|---|
| 6,786,425 B2 | 9/2004 | Rawlings |
| 8,348,182 B2 | 1/2013 | Keren |
| 8,631,820 B2* | 1/2014 | Kobayashi ............ F15B 13/027 137/512.2 |
| 8,801,396 B2* | 8/2014 | Sundquist ................ F01M 1/16 123/196 R |
| 2005/0279856 A1 | 12/2005 | Nalbandian et al. |
| 2008/0087749 A1* | 4/2008 | Ruskin ................. A01G 25/165 239/542 |
| 2013/0233413 A1* | 9/2013 | Williamson .......... F16K 15/025 137/538 |
| 2014/0374502 A1 | 12/2014 | Nourian |

OTHER PUBLICATIONS

List of IBM Patents or Patent Applications Treated as Related.
Non-Final Office Action for U.S. Appl. No. 15/604,001 dated Apr. 11, 2019.

* cited by examiner

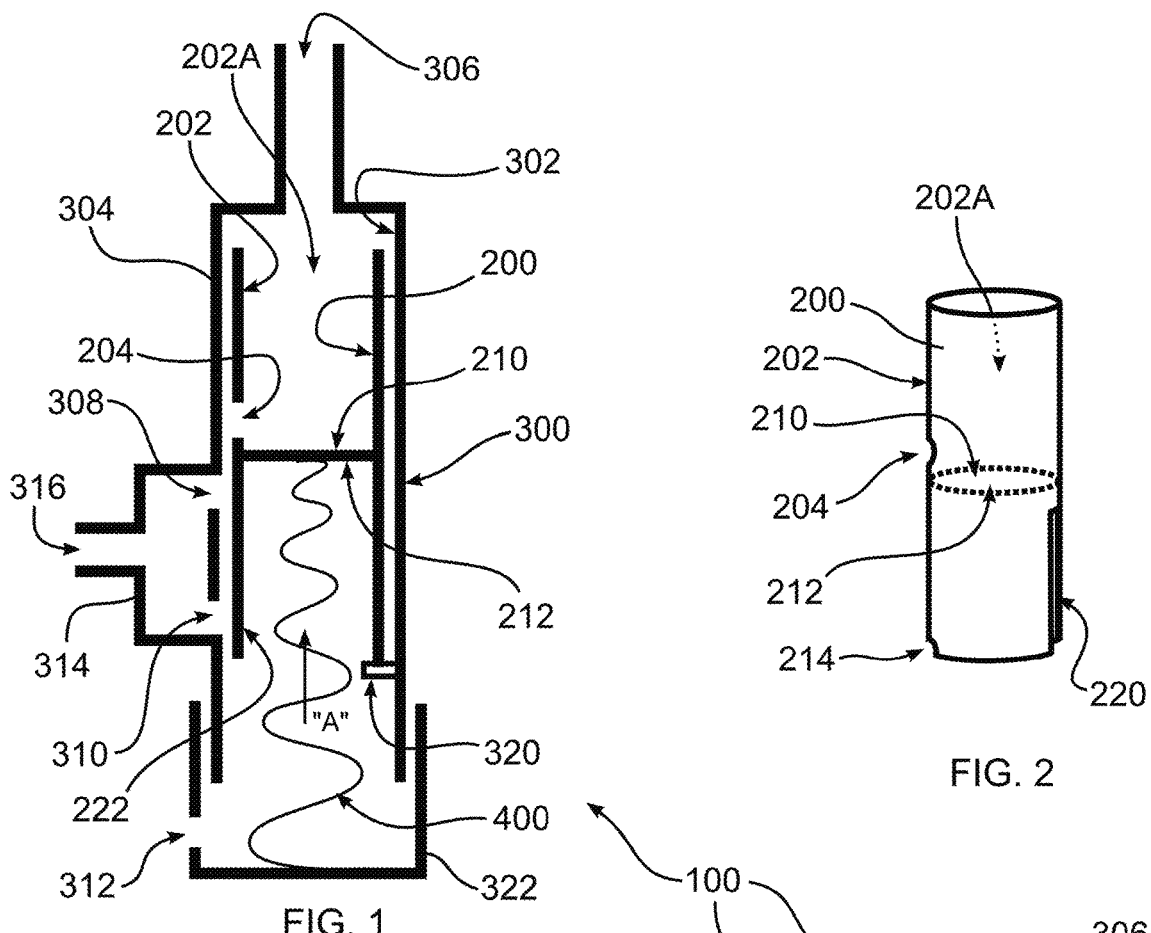
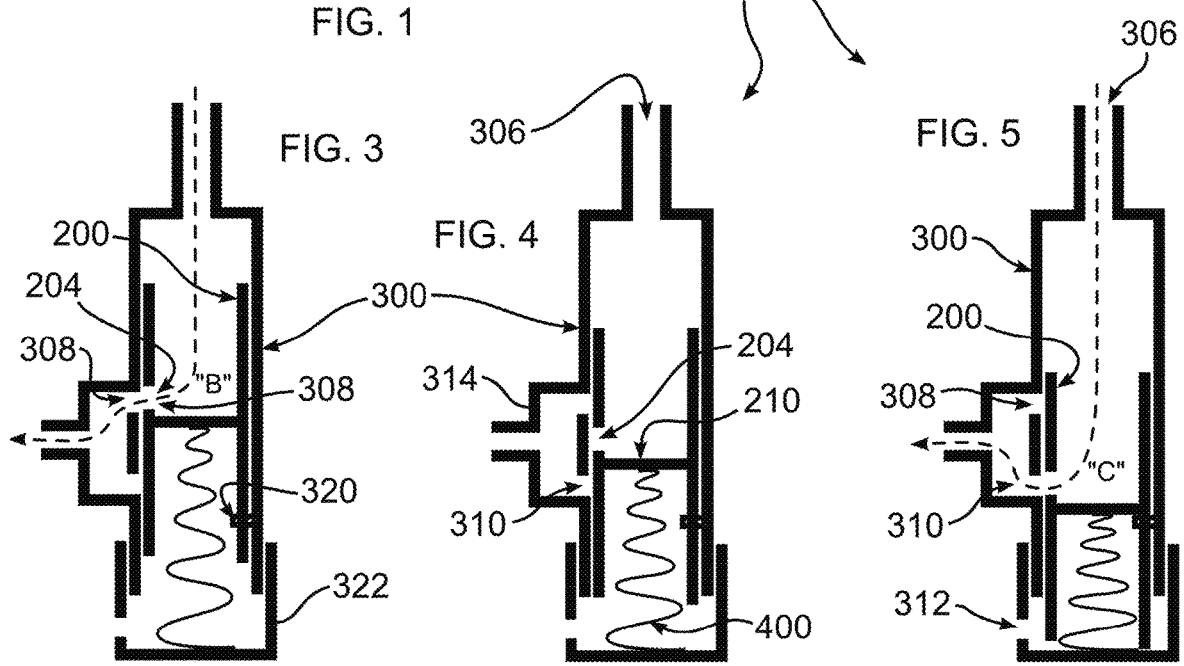

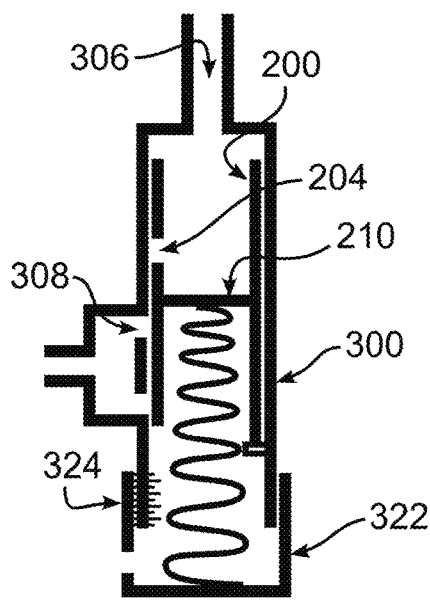
FIG. 6
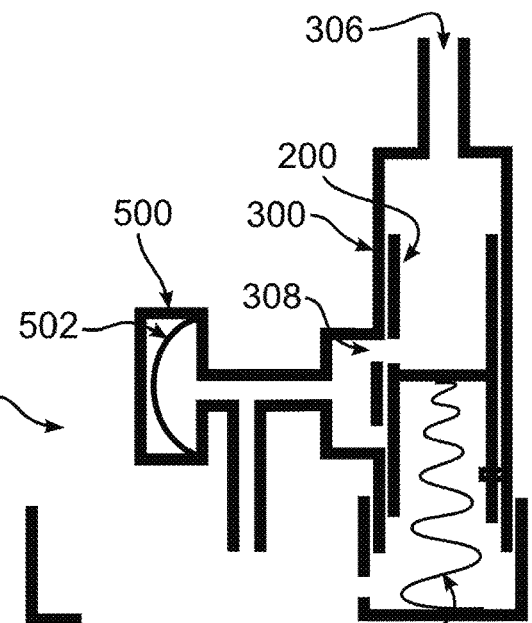
FIG. 7
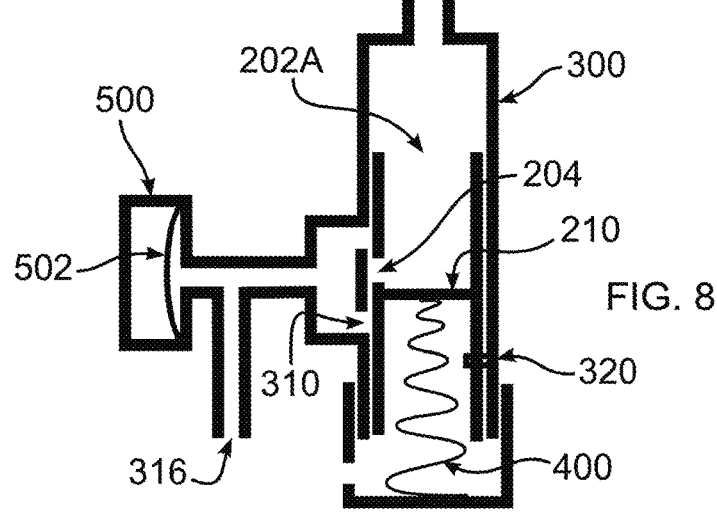
FIG. 8
FIG. 9
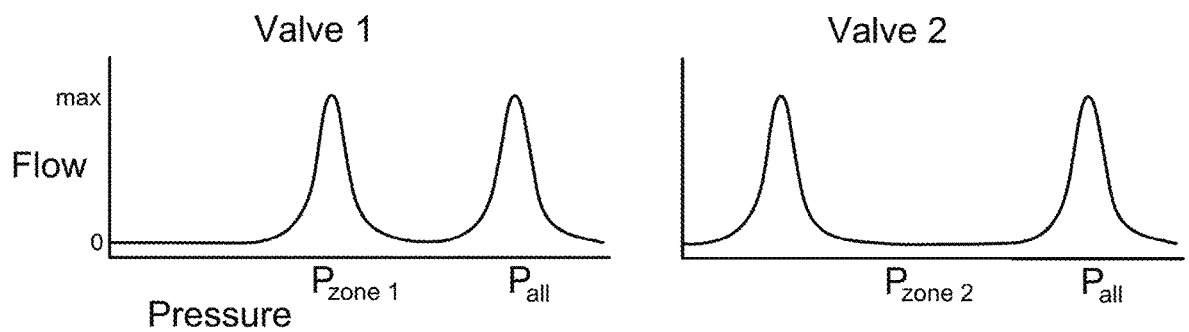

CONTROLLING VALVE OPERATION USING PRESSURE

FIELD OF THE DISCLOSURE

The disclosure relates to a system and method for selectively addressing sets of irrigation valves, and in particular using valves which open at different pressures due to mechanical differences among the valves.

BACKGROUND OF THE DISCLOSURE

European Patent Application EP0537849A1 discloses automatic pulsating deliver of an irrigation liquid by using pressure-sensitive secondary valves which open or close to enable irrigation liquid to emerge.

U.S. Pat. No. 3,917,74 discloses emitters of different flow potential for supplying the same given amount of water at various line pressures. Specific line pressure at each hole in the feeder tube is measured and an emitter adapted to deliver the desired amount of water is selected and installed at the location.

U.S. Pat. No. 6,786,425 discloses an actively operable check valve to selectively exert first and second pressures on the check valve. The valve permits the passage of spray fluid at one of the first and second pressures.

U.S. Pat. No. 8,348,182 discloses an irrigation pipe with integrated emitters having different discharge-pressure thresholds.

U.S. Patent Publication 2005/0279856 discloses a pipe and emitter assembly having a sealing adapter, an emitter tube, and a pressure compensating flow emitter. A controller adjusts irrigation parameters based on data.

U.S. Patent Publication 2014/0374502 discloses a flow regulating drip emitter with labyrinth passageways with different resistance to water flow, wherein movement of a cover selects a passageway.

PCT Publication WO 2010/061375 A1 discloses a drip irrigating system with a pulsating device that converts a low continuous liquid flow rate to a high intermittent and pulsating flow rate, connected to a manifold of pressure-compensated drippers.

SUMMARY OF THE DISCLOSURE

In an embodiment of the disclosure, a valve, comprises a valve body including an interior surface; a fluid inlet communicating fluid into an interior of the valve body; a piston slideable successively through first, second, third, and fourth positions within the valve body and including: a head, a skirt forming an upper skirt portion connected to and extending from the head in a direction of the fluid inlet, the upper skirt portion forming a seal against the interior surface of the valve body; a piston port formed in the upper skirt portion; a low pressure port formed through the interior surface of the valve body, the low pressure port sealed against the interior of the valve body when the piston is in the first and third positions, the low pressure port in fluid communication with the piston port when the piston is in the second position; a high pressure port formed through the interior surface of the valve body, the high pressure port in fluid communication with the piston port when the piston is in the fourth position; and a biasing element positioned within the valve body to urge the piston head in a direction of the first position, the piston moveable against a biasing force of the biasing element to slide successively from the first to the fourth position as the pressure at the fluid inlet is increased.

In variations thereof, the valve further includes a lower skirt portion connected to and extending from the head in a direction away from the fluid inlet, the lower skirt portion forming a seal against the interior surface of the valve body; the lower skirt portion forming a seal against the low pressure port and the high pressure port when the piston is in the first position; the lower skirt portion forming a seal against the high pressure port when the piston is in the second position; and/or the lower skirt portion forming a seal against the high pressure port when the piston is in the second position and the third position, the upper skirt portion forming a seal against the low pressure port when the piston is in the third position.

In further variations thereof, the biasing element is a spring; the valve further includes at least one tab connected to the valve body and slideable within a slot in the piston skirt to prevent rotation of the skirt; and/or the piston has the form of a cylinder; and/or the valve further includes a lower skirt portion connected to and extending from the head in a direction away from the fluid inlet, the piston forming the shape of a cylinder having two open ends, and an interior closed by the piston head.

In another variation thereof, the valve further includes a fluid retaining chamber disposed at an outlet of at least one of the low and high pressure ports; and a membrane dividing the chamber, the membrane displaceable by fluid passing under pressure into the chamber from the at least one of the low and high pressure ports, the membrane movable to a non-displaced configuration to gradually release fluid passed into the chamber when fluid is not passing into the chamber.

In another embodiment of the disclosure, a method of irrigating plants comprises positioning along a supply line of water, a plurality of valves, each valve including: a valve body including an interior surface; a fluid inlet communicating fluid into an interior of the valve body; a piston slideable successively through first, second, third, and fourth positions within the valve body and including: a head, a skirt forming an upper skirt portion connected to and extending from the head in a direction of the fluid inlet, the upper skirt portion forming a seal against the interior surface of the valve body; a piston port formed in the upper skirt portion; a low pressure port formed through the interior surface of the valve body, the low pressure port sealed against the interior of the valve body when the piston is in the first and third positions, the low pressure port in fluid communication with the piston port when the piston is in the second position; a high pressure port formed through the interior surface of the valve body, the high pressure port in fluid communication with the piston port when the piston is in the fourth position; a biasing element positioned within the valve body to urge the piston head in a direction of the first position, the piston moveable against a biasing force of the biasing element to slide successively from the first to the fourth position as the pressure at the fluid inlet is increased configuring first and second sets of valves differently, wherein configuring differently includes providing valves in the first set relative to the second set with at least one of a different biasing element and a different position of the low pressure port, wherein the low pressure port of valves of the first set open at a first pressure, and the low pressure port of valves of the second set open at a second pressure greater than the first pressure, and the low pressure port of the first set are closed at the second pressure; supplying water to the supply line at the first pressure wherein valves of the first set flow water, and valves of the second set do not flow water; and supplying water to the supply line at the second pressure, wherein valves of the second set flow water, and valves of the first set do not flow water.

In variations thereof, configuring includes opening the valve body and replacing at least one of the piston and the biasing element, and closing the valve body; the biasing element is a gas or liquid under pressure admitted to a side of the piston head opposite to a side of the piston head in fluid communication with the fluid inlet; the supply line is at least 600 feet; the supply line is a drip irrigation supply line; and/or the piston further includes a lower skirt portion connected to and extending from the head in a direction away from the fluid inlet, the lower skirt portion forming a seal against the interior surface of the valve body, and wherein supplying water at the first pressure includes blocking the high pressure port with the lower skirt portion.

In another variation thereof, the piston further includes a lower skirt portion connected to and extending from the head in a direction away from the fluid inlet, the lower skirt portion forming a seal against the interior surface of the valve body, and wherein supplying water at an intermediate pressure between the first pressure and the second pressure includes blocking the low pressure port with the upper skirt portion, and blocking the high pressure port with the lower skirt portion.

In another variations thereof, the method further includes supplying water at a third pressure higher than the first pressure and the second pressure, wherein the high pressure port of all of the first and second sets of valves are open.

In a further variation thereof, the valve further includes a fluid retaining chamber disposed at an outlet of at least one of the low and high pressure ports; a membrane dividing the chamber, the membrane displaceable by fluid passing through the piston port and out of the valve body and into the chamber, the membrane movable to a non-displaced configuration to gradually release fluid passed into the chamber when fluid is not passing into the chamber; wherein when supplying water to the supply line at the first pressure, water is passed into the chamber from the low pressure port; and wherein when supplying water to the supply line at the second pressure, water does not pass into the chamber, and water passed into the chamber while applying the first pressure is gradually released.

In a further embodiment of the disclosure, a method of irrigating plants comprises positioning along a supply line of water, a plurality of valves, each valve including: a valve body including an interior surface; a fluid inlet communicating fluid into an interior of the valve body; a piston slideable successively through first, second, third, and fourth positions within the valve body and including: a head, a skirt forming an upper skirt portion connected to and extending from the head in a direction of the fluid inlet, the upper skirt portion forming a seal against the interior surface of the valve body; a piston port formed in the upper skirt portion; a low pressure port formed through the interior surface of the valve body, the low pressure port sealed against the interior of the valve body when the piston is in the first and third positions, the low pressure port in fluid communication with the piston port when the piston is in the second position; a high pressure port formed through the interior surface of the valve body, the high pressure port in fluid communication with the piston port when the piston is in the fourth position; a biasing element positioned within the valve body to urge the piston head in a direction of the first position, the piston moveable against a biasing force of the biasing element to slide successively from the first to the fourth position as the pressure at the fluid inlet is increased wherein the plurality of valves include first and second sets of valves, and wherein valves in the first set relative to the second set have at least one of a different biasing element and a different position of the low pressure port, wherein the low pressure port of valves of the first set open at a first pressure, and the low pressure port of valves of the second set open at a second pressure greater than the first pressure, and the low pressure port of the first set are closed at the second pressure; addressing the first or second set of valves by supplying water to the supply line at the first pressure wherein valves of the first set flow water, and valves of the second set do not flow water, and supplying water to the supply line at the second pressure, wherein valves of the second set flow water, and valves of the first set do not flow water; and supplying water at a third pressure higher than the first pressure and the second pressure, wherein the high pressure port of all of the first and second sets of valves are open and flow water.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 1 depicts a valve of the disclosure, drawn enlarged with respect to the valves of FIGS. 3-8, for clarity, the valve in a closed position in which fluid does not flow through the valve;

FIG. 2 is a perspective view of an embodiment of the piston of FIG. 1;

FIG. 3 depicts the valve of FIG. 1, in which a low pressure port is open;

FIG. 4 depicts the valve of FIG. 1, in an intermediate, closed position;

FIG. 5 depicts the valve of FIG. 1, in which a high pressure port is open;

FIG. 6 depicts the valve of FIG. 1, in which a position of the low pressure port is changed, and a stiffness of a biasing element is changed;

FIG. 7 depicts the valve of FIG. 3, further including a reservoir and membrane which have been charged with a supply of fluid;

FIG. 8 depicts the valve of FIG. 7, in which the valve is in an intermediate, closed position, and in which the charge of fluid is gradually released by pressure imparted by the membrane; and FIG. 9 depicts graphs of pressure and flow for two valves of the disclosure which have been configured to open a low pressure port at relatively different input pressures, and which have a high pressure port which opens at the same pressure.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Drip line irrigation methods are used widely in agriculture to reduce overall water consumption and to more accurately supply water in synchrony with the plants consumption requirements. As sensor methods including satellites have improved, it has become possible to determine with fine granularity the local needs of a field, and in some cases of an individual plant. This makes it desirable to control sections or even individual drip valves. In a long drip line, it is possible to electronically control each drip valve, but this increases the cost and complexity of an irrigation system, and reduces reliability.

In accordance with the disclosure, a method and system are provided which provide fine granularity control using a simple mechanical structure, avoiding a requirement of electronic valve controls or other complex approaches. A system of the disclosure enables "addressing" any valve, or group of valves, simply due to a pressure level within a single supply line. As such, it is possible to address and open valves on a drip line, or higher pressure line, based on line pressure regulated at the source end of the irrigation line, and for any length of line. Each valve of the disclosure has at least one specific pressure at which the valve will open. At other pressures the valve will remain closed.

In a drip irrigation line, the pressure along the line will vary, with higher pressure at the end of the water supply point and the start of the drip irrigation line, with water pressure dropping toward the end of the line. The valves operations is enabled around the equilibrium pressure of the line by modulating the pressure at the location of the valve. Increase or decrease of the pressure will open/close the valve and enable irrigation.

With reference to FIGS. 1-5, a valve 100 includes an inner piston 200 and an outer body 300. Piston 200 is shown in perspective in FIG. 2, and includes an upper piston skirt 202 which forms a watertight seal, along at least a portion of its length, against an inner surface 302 of cylinder 304 of body 300, and which forms an inlet chamber 202A in fluid communication with an inlet 306. In this manner, fluid which enters from a supply line (not shown) through inlet 306, can only pass through valve 100 by passing through piston port 204, and can only do so when port 204 aligns with a cylinder low pressure port 308 or a cylinder high pressure port 310. Piston head 210 is driven away from inlet 306 by pressurized fluid which enters inlet 306.

An underside 212 of piston head 210 is contacted by a biasing element 400 which urges piston 200 in the direction of arrow "A" and into a position in which port 204 is closed, and is sealed against inner surface 302, and in which no fluid flows through valve 100. Biasing element 400 can have the form of a spring, as diagrammatically illustrated in the figures. It should be understood that biasing element 400 can have any known form, including a conical spring as shown, or any other type of spiral spring, including a barrel or hourglass type spring. Alternatively, biasing element 400 can be a pressurized bladder, or a leaf spring, and can be made of any resilient material. Biasing element can be a constant or progressive rate spring, whereby the relationship to an amount of input pressure required for opening of port 308 and port 310 can be linear or non-linear.

A cylinder equalizing port 312 can be provided to enable pressure to equalize on the underside of piston head 210. Piston skirt 202 can similarly be provided with pressure equalizing port 214 or other opening which communicates between pressure relief opening 312 and an interior volume defined by piston underside 210 and skirt 202.

In an alternative embodiment, equalizing port 312 can be used as a pressurizing port, and can be supplied with a fluid, such as air or water, at a predetermined amount of pressure, to thereby set a desired amount of biasing force applied to piston underside 212, thereby setting a particular pressure at which ports 204 and 308, or ports 204 and 310, align and open.

When either port 308 or port 310 is in fluid communication with port 204, fluid can flow from a supply line through inlet 306 to a manifold 314 and then to outlet 316 and then to plants which are to be watered, or to supply fluid for any other purpose, including non-agricultural applications.

An alignment tab 320 can be provided, extending from inner surface 302 of cylinder 304, tab 320 passing through an alignment slot 220 in a lower piston skirt 222 of piston 200 during travel of piston 200, to thereby prevent radial rotation of piston 200 and a consequent misalignment of port 204 with port 308 or 310, and port 214 with port 312. Tab 320 can further cooperate with an extent of slot 220, to limit travel of piston 200. Additionally, lower piston skirt 222 seals against inner surface 302, sealing ports 308 and 310 when they are not aligned with port 204, and prevents backflow of fluid from outlet 316 into valve body 300 during operation of valve 100.

With reference to FIG. 3, as shown by arrow "B", fluid has been admitted into inlet 306 at a first pressure which drives piston 200 downwards when viewed in the figure, whereby ports 204 and 308 align, and fluid can pass through valve 100.

In FIG. 4, the pressure of fluid at inlet 306 has been increased relative to the pressure applied with respect to FIG. 3, and piston 200 has been displaced further away from inlet 306, against a biasing force applied by biasing element 400, to once again seal port 204 against an inner surface 302 of cylinder 304, whereby no fluid can pass through valve 100. In this embodiment, the pressure at inlet 306 is intermediate with respect to a pressure operative to open port 308 and 310, respectively.

In FIG. 5, as the pressure of fluid at inlet 306 is further increased, piston 200 is further displaced away from inlet 306, and port 204 aligns with high pressure port 310, and fluid can once again flow through valve 100 following the path defined by arrow "C". A progressively greater pressure at inlet 306 is required to move piston from a position aligning port 204 with port 308, to a position sealing port 204, and then to a position aligning port 204 with port 310, because biasing element 400 imparts a progressively greater resistance to movement of piston 200. In this manner, port 308 is defined as a low pressure port relative to port 310.

The amount of pressure required to enable fluid to flow through port 204 is dependent on any one or all of the following parameters: a diameter of piston 200, a location of port 204 along skirt 202, a location of port 308, an extent of biasing pressure by biasing element 400, a progressive profile of biasing element 400, an amount of fluid pressure at inlet 306. Other elements which impact fluid flow include backpressure at outlet 316, and stiction or other resistance to movement of the components of valve 100.

Accordingly, the aforedescribed parameters can be changed as part of the design of valve 100, or some of them can be changed in the field, to achieve desired operating parameters of valve 100. For example, as shown in FIG. 6, an end portion 322 of body 300 can be removed or opened, for example using a threaded connection 324, whereby biasing element 400 can be substituted. Likewise, piston 200 can be replaced with a piston 200 and piston skirt 202 of different configuration as described herein, released and reconnected for example be removing and replacing tab 320. As further illustrated in FIG. 6, biasing element 400 can be changed, a location of port 204 can be raised or lowered, and configuration of manifold 314 and a location of ports 308 or 310 can be changed. In the example of FIG. 6, port 204 has been raised towards inlet 306, to therefore require greater pressure in order to be opened. Valve openings can also be enlarged or reduced in size, to change flow rate. It should be understood, however, that any one change, or combination of changes can be made, to achieve a desired change in operating characteristics, and particularly, pressures at which port 308 or 310 will be opened. In this manner, any number of valves 100 can be deployed along a single supply line, and each differently configured valve 100 or group of differently configured valves 100 will open port 204 at a different predetermined low pressure force For example, valves 100 can be arrayed along a supply line so that as fluid pressure is progressively increased, valves will sequentially open and close along the line, watering crops along the line sequentially. This can be advantageous for a variety of reasons, including reducing overall water usage, maintaining pressure in a long line, watering different crops at different places along the line for different periods of time, reducing waste, and reducing water runoff.

While pressure can be increased to sequentially water successive crops, it is also possible to selectively set the supply line pressure to address a particular operating pressure of valve 208 of differently configured valves, regardless of where they have been located along one or more supply lines. In this manner, particular valves 100 are activated at a given pressure, and therefore particular crops which are supplied by those valves. In this manner, crops which require water at different parts of the day, or for different periods of time, can be selectively addressed according to their requirements by changing the supply pressure of a supply line.

By providing a high pressure port 310 as shown and described, it is possible to increase pressure in a supply line to a point where all valves open. This can be useful, for example, to ensure that all crops receive water during peak dry periods, or to provide protection against damage to an irrigation system due to excessive supply line pressure.

In an embodiment, different valves 100 can be configured to open port 310 at different pressures, by configuring a location of port 310, or changing a biasing force of biasing element 400, thereby providing additional options for configuring valve 100. Despite differing operating pressures of port 310, it is still possible to have all valves open at a predetermined pressure.

FIG. 9 is a graph illustrating the operating characteristics of two valves, valve "1" and valve "2", configured to open port 308 at differing pressures. For Valve 1, it can be seen that $P_{zone\ 1}$ corresponds to flow at a higher pressure than for $P_{zone\ 2}$ of Valve 2. However, $P_{all}$ indicates flow at the same pressure for both Valves 1 and 2. In each case, flow occurs of the same range of pressures. However, this can be configured, as well, for example by changing a biasing rate of biasing element 400, and/or by changing a distance between ports 308 and 310 for differing valves 100.

Referring now to FIGS. 7 and 8, in an alternative embodiment, a flow reservoir 500 is provided, attached to outlet 316. Reservoir 500 includes a displaceable membrane 502, which is displaced by pressure from fluid that has passed through valve 100. When pressure at inlet 306 no longer corresponds to flow through port 204, reservoir 500 can continue to gradually provide irrigation, for example drip irrigation, as displaceable member 502 returns to a non-displaced orientation, pushing fluid out of reservoir 500. In an embodiment, membrane 502 forms a resilient bladder, which can be, for example, rubber or plastic, although other configurations are possible, for example a spring biased diaphragm.

In an embodiment, reservoir 500 is connected to only one of the outlets of either the low pressure port 308 or the high pressure port 310. For this embodiment, manifold 314, if present, has a different configuration to enable fluid to escape from ports 308 and 310 along different flow paths.

By using reservoir 500, pressure in a supply line can be steadily increased to successively and briefly charge reservoir 500 for valves which operate at various pressures, after which a continuous and steady irrigation can take place as fluid is gradually released from all charged reservoirs 500 by the biasing of membrane 502 to a non-displaced orientation. To prevent port 310 from opening, it is advantageous if the maximum pressure required to open any of valve 308 is less than a pressure required to open any of valve 310, among all differently configured valves 100.

For a drip line, in an example of the foregoing, given a flow rate of 1 drop being about equal to 0.05 ml; at 30 drops per min flow is about 1.5 mL/min, or about 7.5 mL/5 min. Further given 50 zones and a 10 mL reservoir, cycling from valves operable at different low pressure values could occur at 10 second intervals, giving full control of the drip line with 5 minute granularity. Of course, other time values and flow rates can be configured as best meets the needs of a given crop and climate.

It should be understood that, for a given valve, more than one port 204, or more than one port 308 can be provided, enabling different lower pressure operating values for the valve.

Thus, in accordance with the disclosure, the pressure addressable valve 100 of the disclosure has the properties illustrated in the figures of allowing fluid to be transmitted through the valve at discrete pressures. This enables the valve to be addressed by selecting a pressure via a regulator at the source end of a supply/drip line. Further, all valves connected to a given pipeline, or collection of connected pipelines, can be controlled from a single location. This can be particularly helpful for long lines, for example a drip line of 600 feet, or any length whatsoever. Valves can be organized or segmented into zones containing valves designed to operate at a pressure unique to that zone.

While the embodiments shown have two zones, a lower and higher pressure zone, it should be understood that either port 308 or port 310 can be eliminated. Additionally, all valves along a given supply line can operated at the same pressure for opening port 308. For example, valves can be configured to open at the same low pressure value, and at different pressures at a higher pressure. In this manner, a baseline irrigation can be provided for all crops, while individual zones can be provided with water at a higher rate.

It should be understood that the shape of valve 100 and its constituent parts have been illustrated in a simple manner which bests clarifies the function of the parts and other aspects of the disclosure. However, these parts may have a different shape, although with the same functionality, to accommodate improved flow, ease of maintenance and installation, ease and reduced cost of manufacturing, and other considerations understood within the art.

What is claimed is:

1. A device for irrigation, comprising:
a valve body including an interior surface;
a fluid inlet communicating fluid into an interior of the valve body;
a piston slideable successively through first, second, third, and fourth positions within the valve body and including:
a head,
a skirt forming an upper skirt portion connected to and extending from the head in a direction of the fluid inlet, the upper skirt portion forming a seal against the interior surface of the valve body;
a piston port formed in the upper skirt portion;
a low pressure port formed through the interior surface of the valve body, the low pressure port sealed against the interior of the valve body when the piston is in the first and third positions, the low pressure port in fluid communication with the piston port when the piston is in the second position;
a high pressure port formed through the interior surface of the valve body, the high pressure port in fluid communication with the piston port when the piston is in the fourth position;
a biasing element positioned within the valve body to urge the piston head in a direction of the first position, the piston moveable against a biasing force of the biasing element to slide successively from the first to the fourth position as the pressure at the fluid inlet is increased;
a fluid retaining chamber disposed at an outlet of the at least one of the low and high pressure ports; and
a membrane dividing the chamber, the membrane displaceable by fluid passing under pressure into the chamber from the at least one of the low and high pressure ports, the membrane resiliently movable to a non-displaced configuration to gradually release fluid passed into the chamber when fluid is not passing into the chamber.

2. The device of claim 1, further including a lower skirt portion connected to and extending from the head in a direction away from the fluid inlet, the lower skirt portion forming a seal against the interior surface of the valve body.

3. The device of claim 2, wherein the lower skirt portion forms a seal against the low pressure port and the high pressure port when the piston is in the first position.

4. The device of claim 2, wherein the lower skirt portion forms a seal against the high pressure port when the piston is in the second position.

5. The device of claim 2, wherein the lower skirt portion forms a seal against the high pressure port when the piston is in the second position and the third position, the upper skirt portion forming a seal against the low pressure port when the piston is in the third position.

6. The device of claim 1, wherein the biasing element is a spring.

7. The device of claim 1, further including at least one tab connected to the valve body and slideable within a slot in the piston skirt to prevent rotation of the skirt.

8. The device of claim 1, wherein the piston has the form of a cylinder.

9. The device of claim 1, further including a lower skirt portion connected to and extending from the head in a direction away from the fluid inlet, the piston forming the shape of a cylinder having two open ends, and the piston head divides the two open ends.

10. The device of claim 1, wherein the valve body is openable to enable access to replace at least one of the piston and the biasing element.

11. The device of claim 1, wherein the biasing element is a gas or liquid under pressure, the valve further including a port for admission of the biasing element to a side of the piston head opposite to a side of the piston head in fluid communication with the fluid inlet.

12. An addressable fluid delivery system, comprising:
a supply line for supplying fluid; and
a plurality of control devices connected along the length of the supply line, each comprising:
a valve body including an interior surface;
a fluid inlet communicating fluid into an interior of the valve body;
a piston slideable successively through first, second, third, and fourth positions within the valve body and including:
a head,
a skirt forming an upper skirt portion connected to and extending from the head in a direction of the fluid inlet, the upper skirt portion forming a seal against the interior surface of the valve body, and
a piston port formed in the upper skirt portion;
a low pressure port formed through the interior surface of the valve body, the low pressure port sealed against the interior of the valve body when the piston is in the first and third positions, the low pressure port in fluid communication with the piston port when the piston is in the second position;
a high pressure port formed through the interior surface of the valve body, the high pressure port in fluid communication with the piston port when the piston is in the fourth position; and
a biasing element positioned within the valve body to urge the piston head in a direction of the first position, the piston moveable against a biasing force of the biasing element to slide successively from the first to the fourth position as the pressure at the fluid inlet is increased;
whereby fluid introduced into the supply line at predetermined pressures selectively causes sets of the plurality of control devices to pass fluid through a low pressure port, a high pressure port, or both the low and high pressure ports.

13. The device of claim 12, wherein the supply line is an irrigation supply line.

14. The system of claim 12, the plurality of control devices organized in at least two sets of devices which have either the low pressure port or the high pressure port in communication with the piston port at the same time to thereby separately introduce fluid to different areas along which the supply line is arranged.

15. The device of claim 14, wherein at least two of the at least two sets of devices have biasing elements exerting different forces with respect to each other.

16. The device of claim 12, further including at least one of an additional low pressure port and an additional high pressure port.

17. The device of claim 12, further including a pressure relief port positioned through the valve body on a side of the valve body opposite to the fluid inlet.

18. The system of claim 12, the lower skirt portion forming a seal against the low pressure port and the high pressure port when the piston is in the first position; and the lower skirt portion forming a seal against the high pressure port when the piston is in the second position.

19. The device of claim 12, wherein the piston is movable to a fifth position in which the piston skirt is positioned away from the low pressure port and the high pressure port, to thereby enable fluid to pass through both of the low pressure port and the high pressure port, when fluid pressure is introduced into the supply line at a pressure greater than is required to move the piston to the fourth position.

20. The device of claim 12, further including a lower skirt portion connected to and extending from the head in a direction away from the fluid inlet, the piston forming the shape of a cylinder having two open ends, and the piston head divides the two open ends.

* * * * *